(12) United States Patent
Yang et al.

(10) Patent No.: US 11,501,031 B2
(45) Date of Patent: Nov. 15, 2022

(54) METHOD FOR CALCULATING PROCESSING PARAMETERS FOR RESIDUAL STRESS CONTROL BY PARAMETER INVERSION

(71) Applicant: HUAZHONG UNIVERSITY OF SCIENCE AND TECHNOLOGY, Hubei (CN)

(72) Inventors: Wenyu Yang, Hubei (CN); Kun Huang, Hubei (CN); Yi Gao, Hubei (CN); Shuo Qiu, Hubei (CN); Tao Wang, Hubei (CN); Guangdong Cheng, Hubei (CN); Kun Yang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 897 days.

(21) Appl. No.: 16/373,606

(22) Filed: Apr. 2, 2019

(65) Prior Publication Data
US 2019/0228129 A1    Jul. 25, 2019

Related U.S. Application Data

(63) Continuation-in-part of application No. PCT/CN2017/093256, filed on Jul. 18, 2017.

(30) Foreign Application Priority Data
Jun. 28, 2017   (CN) .......................... 201710504692.7

(51) Int. Cl.
*G06F 30/17*       (2020.01)
*G01L 5/00*        (2006.01)
(Continued)

(52) U.S. Cl.
CPC ............ *G06F 30/17* (2020.01); *G01L 5/0047* (2013.01); *G06N 5/04* (2013.01); *G06F 2111/10* (2020.01); *G06F 2119/18* (2020.01)

(58) Field of Classification Search
CPC ....... A61F 2/28; B24D 18/0009; G06F 30/17; G06F 2111/10; G01L 5/0047; G06N 5/04; G01B 7/345; B23P 23/04; H01L 23/373
See application file for complete search history.

(56) References Cited

U.S. PATENT DOCUMENTS

| 6,448,764 | B2 * | 9/2002 | Noe ....................... G01B 7/345 324/209 |
| 2007/0205184 | A1 * | 9/2007 | Mazumder .............. B23P 23/04 219/121.84 |

(Continued)

FOREIGN PATENT DOCUMENTS

CN        106897484 A  *  6/2017  ............... B24B 1/00

OTHER PUBLICATIONS

El-Axir "A method of modeling residual stress distribution in turning for different materials" hereinafter El-Axir, see (Fig. 1, Tables 2 and 3). Pergamon International Journal of Machine Tools & Manufacture 42 (2002) 1055-1063; received in revised forn Mar. 17, 2002; (Year: 2002).*

(Continued)

*Primary Examiner* — Catherine T. Rastovski
*Assistant Examiner* — Kaleria Knox
(74) *Attorney, Agent, or Firm* — JCIPRNET (57) ABSTRACT

The present invention belongs to the field of processing residual stress, and discloses a method for calculating processing parameters for residual stress control by parameter inversion. This method comprises: (a) extracting a characteristic index reflecting the residual stress distribution characteristic from a residual stress distribution curve; (b)

(Continued)

respectively presetting initial values of processing parameters for residual stress control, calculating an initial value of the characteristic index, and drawing curves of the characteristic index over the respective processing parameters to obtain respective fitted curves; (c) respectively establishing a relation formula between respective characteristic index increment of the processing parameters and the fitting curve; and (d) assigning the values and performing inversion calculation to obtain the required processing parameters. The present invention is simple in operation, reduces the number of tests, lowers the production cost, improves the processing residual stress distribution of the workpiece and improves the anti-fatigue life of the components.

11 Claims, 7 Drawing Sheets

(51) Int. Cl.
*G06N 5/04* (2006.01)
*G06F 111/10* (2020.01)
*G06F 119/18* (2020.01)

(56) References Cited

U.S. PATENT DOCUMENTS

2014/0050942 A1* 2/2014 Guo ............... A61F 2/28
 29/90.01
2016/0369567 A1* 12/2016 Scott ............... B24D 18/0009
2019/0106613 A1* 4/2019 Wang ............... H01L 23/373

OTHER PUBLICATIONS

"Processing parameters optimization on control of residual stresses and distortion during high-speed milling of thin-walled workpiece" Jiang Xiaohui ISSN: 1662-9795, vols. 531-532, pp. 118-121 (Year: 2013).*

Kun Huang et.al., "Experimental investigation of the application of parameter inversion for residual stress adjustment in five-axis milling using an annular cutter" International Journal of Advanced Manufacturing Technology (2019) 105:3233-3247 (Year: 2019).*

I. Lazoglu et.al., "An enhanced analytical model for residual stress prediction in machining". CIRP Annals—Manufacturing Technology 57 (2008) 81-84 (Year: 2008).*

* cited by examiner

METHOD FOR CALCULATING PROCESSING PARAMETERS FOR RESIDUAL STRESS CONTROL BY PARAMETER INVERSION

CROSS-REFERENCE TO RELATED APPLICATION

This is a continuation-in-part of international PCT application serial no. PCT/CN2017/093256, filed on Jul. 18, 2017, which claims the priority benefit of China application no. 201710504692.7, filed on Jun. 28, 2017. The entirety of each of the abovementioned patent applications is hereby incorporated by reference herein and made a part of this specification.

BACKGROUND OF THE PRESENT INVENTION

Field of the Present Invention

The present invention belongs to the field of processing residual stress, and more particularly relates to a method for calculating processing parameters for residual stress control by parameter inversion.

Description of the Related Art

The residual stress distribution of the processed surface layer of the workpiece has a significant influence on the anti-corrosion and anti-fatigue life of the part. The surface residual tensile stress can easily induce corrosion fatigue crack propagation, thereby reducing the service life of the part; and the surface residual compressive stress is beneficial to mitigation of the corrosion fatigue crack propagation, thereby prolonging the service life of the part. When the processing step is the last step, the residual stress distribution in the processed surface layer has a direct impact on the service life of the part, and the processing residual stress distribution is affected by the processing parameters (including tool parameters). For example, for cutting processing, the residual stress distribution caused by different cutting speeds, feed rates, cutting depths, and tool rake angles are different; and for grinding processing, the residual stress distribution caused by different grinding speeds, feed rates, grinding depths, grinding wheel grain sizes and so on are also different. At present, a large number of literatures have studied the effect of different processing parameters on the residual stress distribution from theoretical modeling and experimental measurements, and to a certain extent, prediction of the residual stress distribution is achieved by the use of processing parameters and material properties.

With a certain residual stress distribution, the anti-corrosion and anti-fatigue life of the workpiece can be estimated through experiments, so that it can be judged which kind of residual stress distribution is most beneficial to the anti-corrosion and anti-fatigue life. However, it has not yet been reported how to achieve this residual stress distribution which is most beneficial to the anti-corrosion and anti-fatigue life though processing. Theoretically, a specific combination of processing parameters can only give a specific residual stress distribution, but a specific residual stress distribution can correspond to countless combinations of processing parameters. How to solve such kind of "one-to-many" mapping relationship from residual stress to processing parameters is the key problem in achieving the required residual stress distribution by processing, and achievement of the required residual stress by processing is called control of the processing residual stress. In fact, in order to increase the residual compressive stress, special process methods such as shot peening and heat treatment can be used. However, these processing methods can only qualitatively control the residual stress. When these processing methods are actually adopted, relevant processing parameters are also involved, and it still has to be faced with how to set the processing parameters to quantitatively control the residual stress and obtain the required residual stress distribution. At present, the method of controlling the residual stress through processing mainly includes a test method in which a set of processing parameters are first set according to experience, then the set of processing parameters are used for trial processing, and the residual stress distribution is measured after the processing to determine whether it meets the demand; if the demand is not met, the processing parameters are regulated and trial processing is performed again, so that the cycle repeats until the required residual stress distribution is obtained. This test method requires a lot of human, material and financial resources, and when the workpiece material changes, the test method needs to be used again to find suitable processing parameters, which further increases the cost for residual stress control.

SUMMARY OF THE PRESENT INVENTION

In view of the above-described problems, the present invention provides a method for calculating processing parameters for residual stress control by parameter inversion, in which parameters that affect the residual stress are calculated by inversion equations so that the residual stress after processing reaches a preset value, thereby solving the technical problem of quantitative control of the residual stress.

In order to achieve the above objective, according to an aspect of the present invention, there is provided a method for calculating processing parameters for residual stress control by parameter inversion, comprising:

(a) acquiring a residual stress distribution curve of a processed surface layer of a workpiece by a sensor, extracting a characteristic index Drs reflecting a residual stress distribution characteristic from the residual stress distribution curve and simultaneously acquiring a plurality of processing parameters $A_i$ (i=1, 2, 3 . . . n) correlated to the characteristic index, where i is a serial number of the processing parameter and n is the total number of the processing parameters;

(b) presetting initial values $a_{10}, a_{20}, \ldots, a_{i0}, \ldots, a_{n0}$ of the plurality of the processing parameters $A_i$ by a preprocessor, obtaining an initial value $H(a_{10}, a_{20}, \ldots, a_{i0}, \ldots, a_{n0})$ of the characteristic index according to the initial values of the plurality of the processing parameters, and respectively fitting signal-variable curves of each of the characteristic index over the respective processing parameters $A_i$ to obtain respective fitted functions $Drs(A_i)$;

(c) setting expected values of the characteristic index Drs according to actual needs and assigning characteristic index increments $\Delta Drs^{A_i}$ corresponds to each of the processing parameters $A_i$ by an assignment allocation unit;

(d) transmitting the initial value $H(a_{10}, a_{20}, \ldots, a_{i0}, \ldots, a_{n0})$ of the characteristic index, the fitted function $Drs(A_i)$ of the characteristic index, the characteristic index Drs, and each of the characteristic index increments $\Delta Drs^{A_i}$ to a microprocessor through a input interface, the microprocessor obtaining respective characteristic index Drs corresponding to each of the processing parameters $A_i$ according to relation formulas (i), (ii) and (iii), combining the characteristic index Drs with the fitted function Drs($A_i$) to obtain the plurality of the processing parameters $A_i$, and outputting the plurality of the processing parameters $A_i$, wherein the relation formulas (i), (ii) and (iii) are $$\Delta Drs^{A_i} = Drs(A_i) - H(a_{10}, a_{20}, \ldots, a_{i0}, \ldots, a_{n0}) \quad \text{(i)}$$

$$\Delta Drs = \sum_{i=1}^{n} \Delta Drs^{A_i} \quad \text{(ii)}$$

$$\Delta Drs = Drs - H(a_{10}, a_{20}, \ldots, a_{i0}, \ldots, a_{n0}); \quad \text{(iii)}$$

(e) storing the plurality of the processing parameters $A_i$ output from the microprocessor to memory;

(f) outputting the plurality of the processing parameters $A_i$ in the memory to a control unit of a machine tool to control the machine tool to process the workpiece, so the processed surface layer of the workpiece has a needed residual stress.

Preferably, the characteristic index includes the maximum surface residual stress, the maximum residual compressive stress depth in the surface layer or the depth of the surface tensile stress layer.

Preferably, in the step (b), the processing parameters include cutting speed, feed rate, cutting depth, tool edge radius or tool rake angle.

Preferably, in the step (b), the initial value $H(a_{10}, a_{20}, \ldots, a_{i0}, \ldots, a_{n0})$ of the characteristic index is calculated by a residual stress analytical model or experimentally measured.

Preferably, in the step (b), the drawn curves of the characteristic index over the respective processing parameters $A_i$ are obtained by a processing residual stress theoretical model or experimental measurements.

In general, compared with the prior art, the present invention has the following beneficial effects:

1. the present invention provides parameters affecting the residual stress, which are calculated by a system of inversion equations, so that the residual stress after processing reaches a preset value, the mapping limitation only from the processing parameters to the residual stress is broken through, and thus the quantitative control of the residual stress is achieved;

2. the present invention forms a system of equations by adopting linear inversion equations, which has simple structure, simple calculation process and short calculation time and clearly and intuitively shows the relationship among various parameters and variables;

3. the method for calculating processing parameters for residual stress control provided in the present invention has wide range of application, and is applicable to processing methods such as forging, welding, laser processing, wire cutting, grinding, drilling, turning, boring, milling, shot peening and heat treatment; and 4. the present invention realizes quantitative control of the processing residual stress by calculating values of processing parameters affecting the residual stress, and the algorithm has simple operation, thereby reducing the number of tests and lowering the production cost, and improves the processing residual stress distribution of the workpiece, thereby improving the anti-fatigue life of the components.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention.

Figure 1:
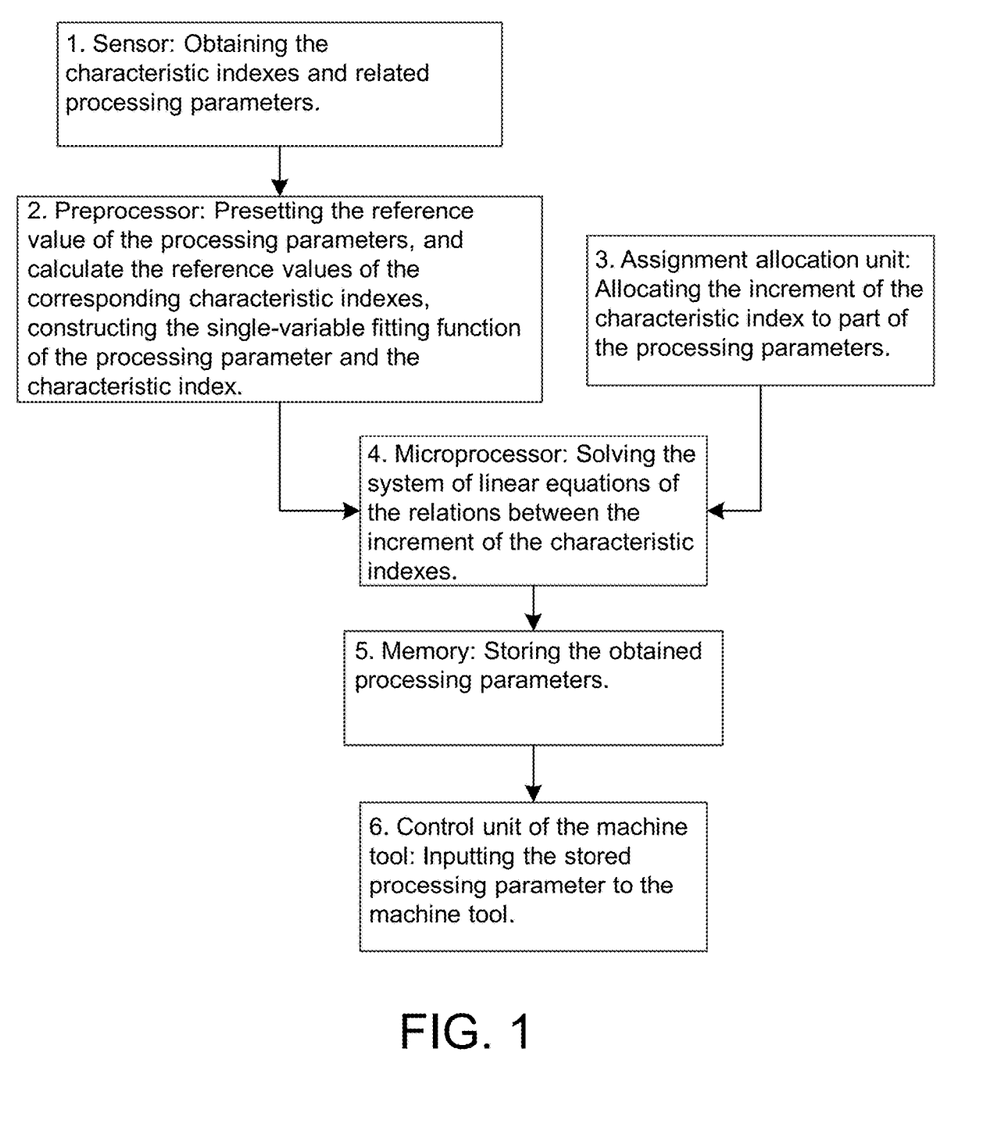
FIG. 1 is a flowchart of a method for calculating processing parameters for residual stress control by parameter inversion according to preferred embodiments of the present invention.
Figure 12:
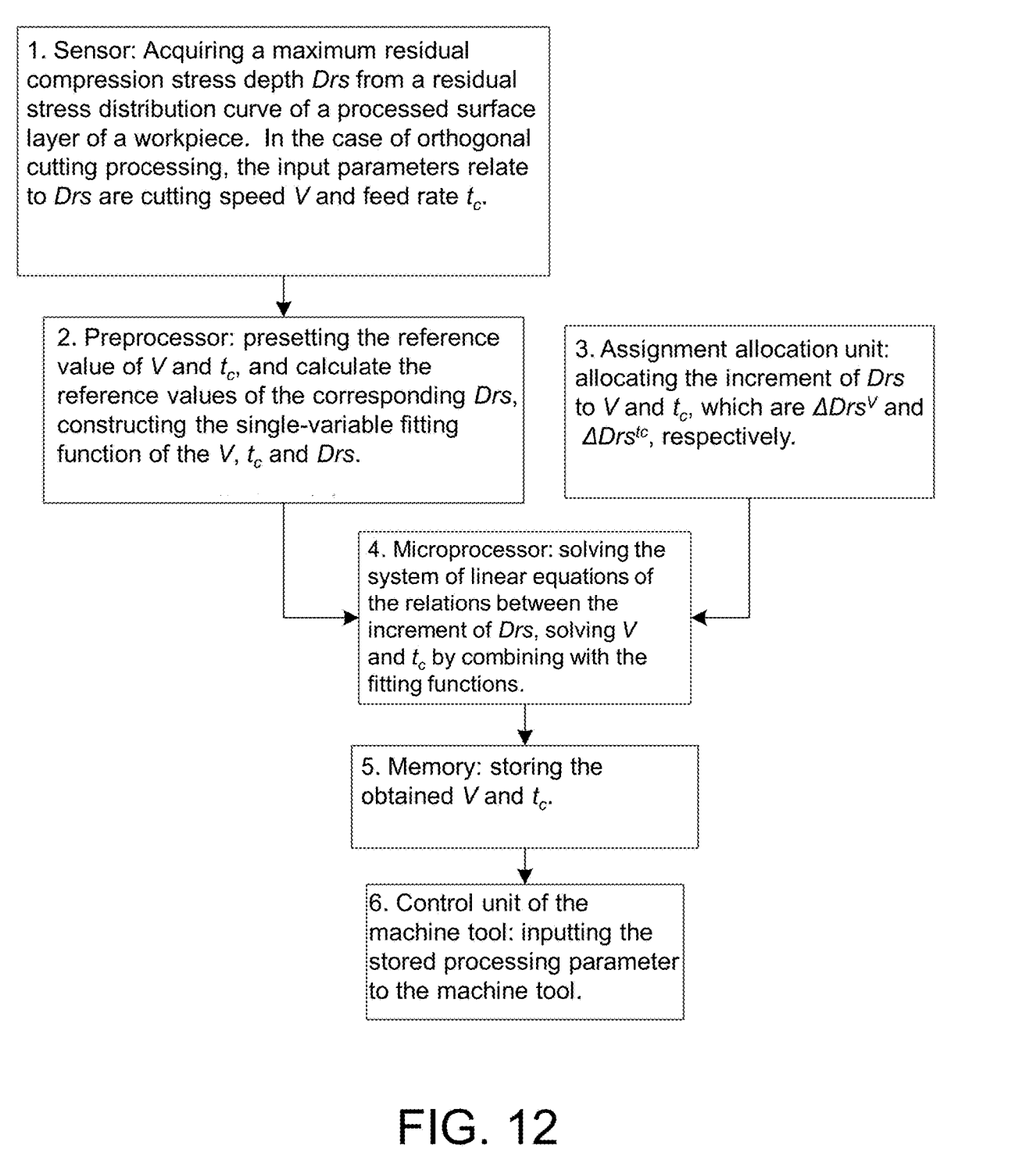
FIG. 12 is a flowchart of a method for calculating processing parameters for residual stress control by parameter inversion according to preferred embodiments of controlling the residual stress of the cutting processing of the present invention.

FIG. 1 is a flowchart of a method for calculating processing parameters for residual stress control by parameter inversion according to preferred embodiments of the present invention. According to FIG. 1, one can obtain the flowchart of this embodiment, as shown in FIG. 12. This method will be described below in conjunction with the example of residual stresses in the orthogonal cutting processing.

Figure 2:
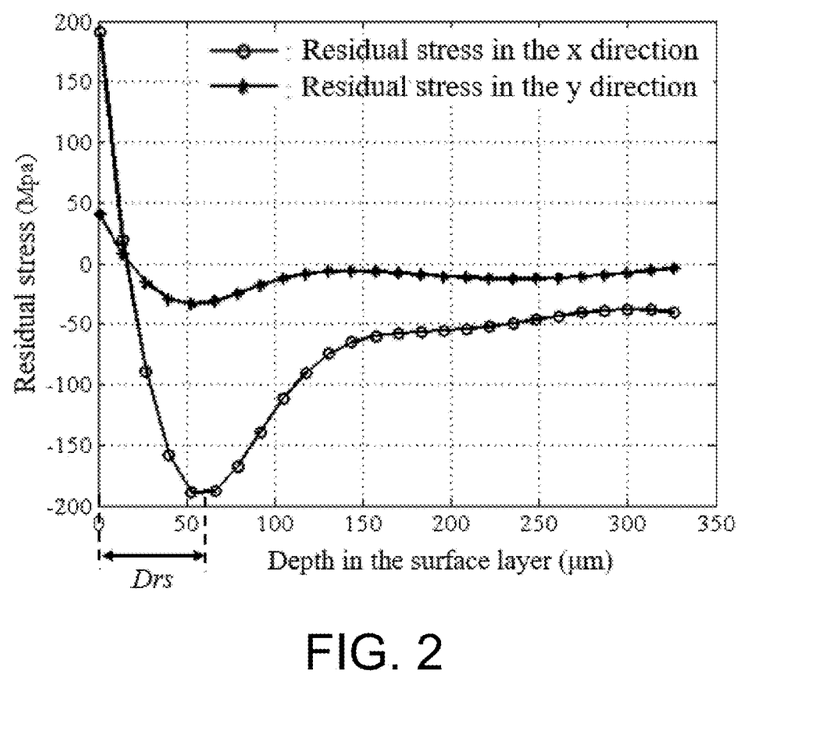
FIG. 2 is a distribution graph of residual stresses at different depths in the surface layer and a schematic diagram of a curve characteristic index Drs according to the preferred embodiments of the present invention.

(a) Acquiring a residual stress distribution of a processed surface layer of a workpiece by a sensor, drawing a curve of the variation of the residual stress to the depth to determine a characteristic index of a distribution curve of residual stresses. FIG. 2 is a distribution graph of residual stresses at different depths in the surface layer and a schematic diagram of a maximum residual compressive stress depth Drs according to the preferred embodiments of the present invention. In this example, only the maximum residual compressive stress depth Drs in the characteristic indexes of the residual stress distribution curve in the x direction is studied. By using a sensor to identify the cutting input parameters related to the maximum residual compressive stress depth Drs, the variation of the Drs could be studied through controlling the variables, which is measuring the variation of the Drs by the sensor when one of the cutting input parameter varies. In this embodiment, the related cutting input parameters are cutting speed V and the feed rate $t_c$.

(b) Reference values of the characteristic index of the residual stress distribution curve and processing parameters associated with it are set by the preprocessor. For the cutting processing, processing parameters affecting Drs include the cutting speed V and the feed rate $t_c$. In a case of set reference values $V_0=60$ m/min and $t_{c0}=0.11$ mm/r, $H(V_0,t_{c0})$ is calculated by a residual stress analytical model for the orthogonal cutting processing as a reference value of Drs. Noted that the material assumed for the model is nickel-aluminum bronze alloy with elemental composition shown in Table 1, and other input variables in the model are shown in Table 2 and Table 3.

TABLE 1 chemical composition of the nickel-aluminum bronze alloy

| Symbol | Element | | | | | |
|---|---|---|---|---|---|---|
| | Copper Cu | Aluminum Al | Ferrum Fe | Nickel Ni | Manganese Mn | Carbon C |
| Mass percent (%) | 77-82 | 8.5-10.0 | 2.0-6.0 | 3.0-6.0 | 0.8-2.5 | ≤0.10 |

TABLE 2 physical properties of the nickel-aluminum bronze alloy

| Elasticity modulus E | Yield stress $\sigma_s$ | Specific heat capacity c | Poisson's ratio | Density $\rho_0$ | linear expansion coefficient $\alpha_0$ | Melting point |
|---|---|---|---|---|---|---|
| 110 (Gpa) | 300 (Mpa) | 419 (J/(kg*° C.)) | 0.327 | 7280 (kg/m³) | 12*10⁻⁶ (/° C.) | 1060 (° C.) |

TABLE 3 values of other input variables in the residual stress analytical model

| Friction coefficient of tool flank μ | Cutting width w (mm) | Shear angle φ (°) | Thermal conductivity λ (W/(mm° C.)) |
|---|---|---|---|
| 0.22 | 5 | 22 | 0.03 |

| Length of wear land of tool frank VB (mm) | Rake angle α (°) | Cutting force in the cutting speed direction $F_c$ (N) | Cutting force in the feed direction $F_t$ (N) |
|---|---|---|---|
| 0.04 | 17 | 1000 | 300 |

Figure 3:
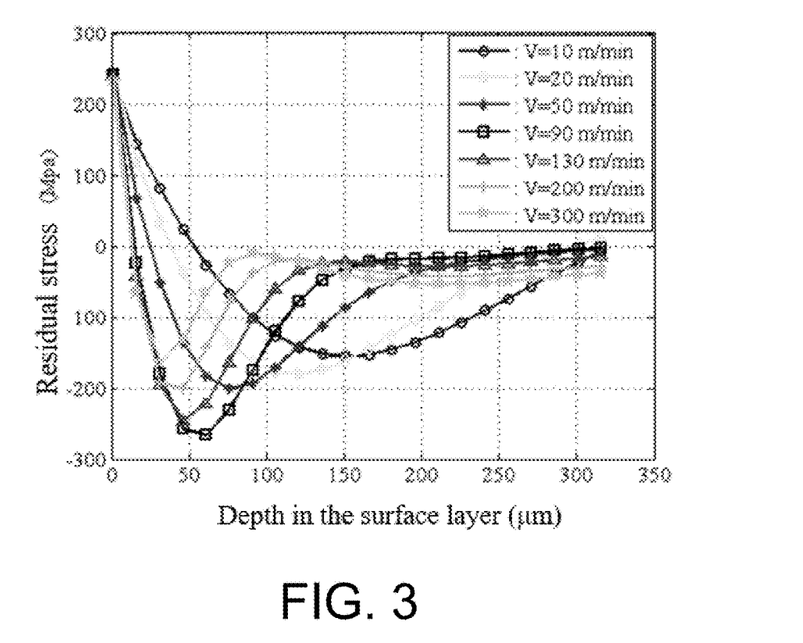
FIG. 3 is a distribution graph of residual stresses at different cutting speeds according to the preferred embodiments of the present invention.
Figure 4:
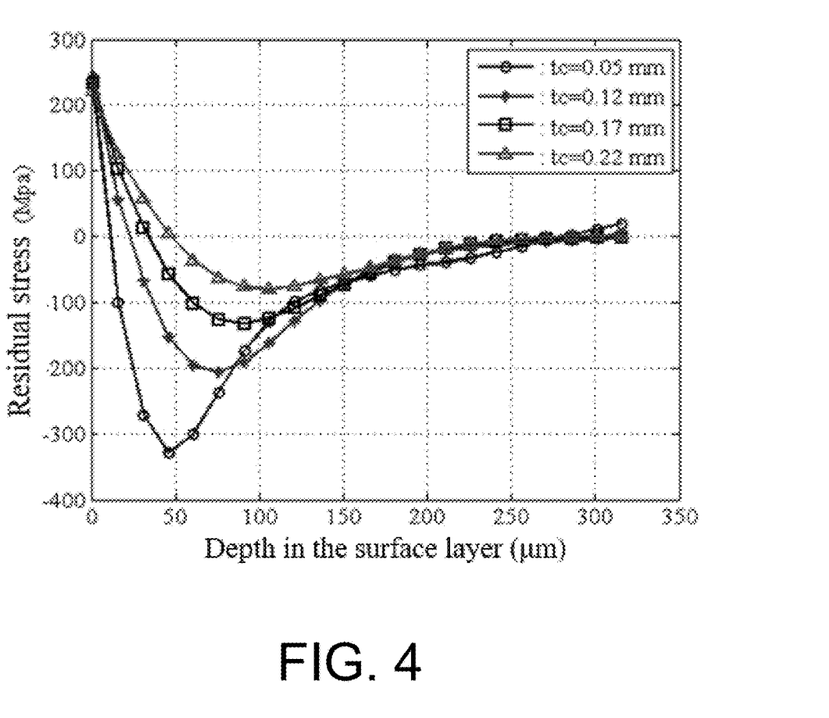
FIG. 4 is a distribution graph of residual stresses at different feed rates according to the preferred embodiments of the present invention.

A curve of residual stress distribution in the surface layer under the independent action of each processing parameter (such as cutting speed, feed rate, cutting depth and tool rake angle) is obtained by the processing residual stress theoretical model or experimental measurement, and a curve of the characteristic index over each processing parameter is fitted. FIG. 3 is a distribution graph of residual stresses at different cutting speeds according to the preferred embodiments of the present invention, and FIG. 4 is a distribution graph of residual stresses at different feed rates according to the preferred embodiments of the present invention.

Figure 5:
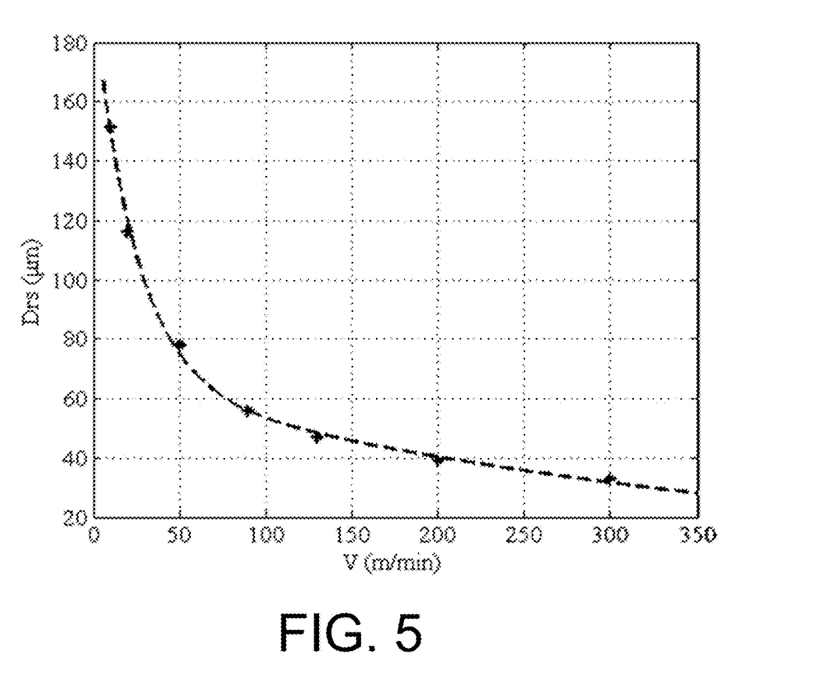
FIG. 5 is a distribution graph of the characteristic index over the cutting speed according to the preferred embodiments of the present invention.
Figure 6:
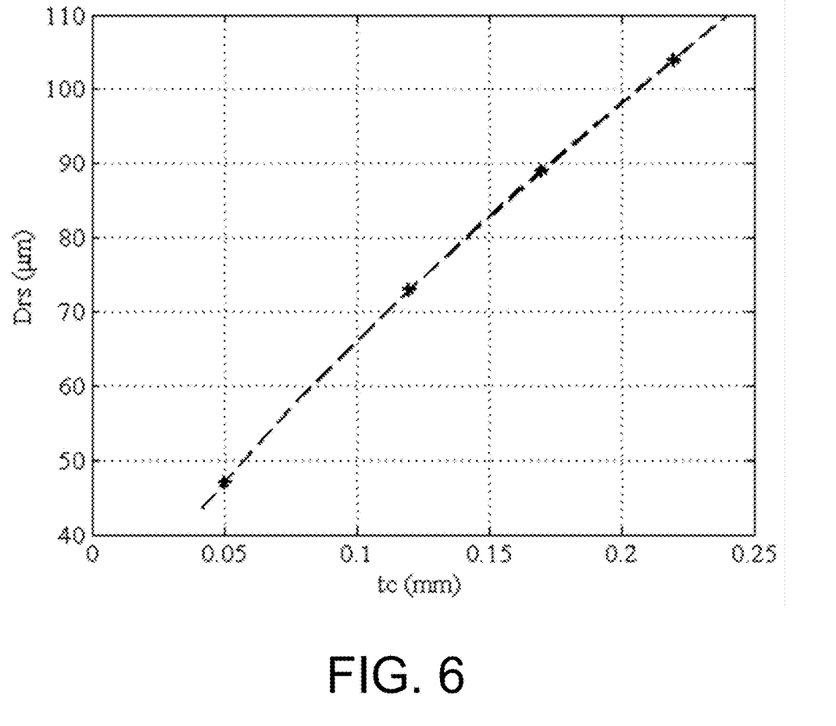
FIG. 6 is a distribution graph of the characteristic index over the feed rate according to the preferred embodiments of the present invention.

FIG. 5 is a distribution graph of the characteristic index over the cutting speed according to the preferred embodiments of the present invention, and FIG. 6 is a distribution graph of the characteristic index over the feed rate according to the preferred embodiments of the present invention. Drs in the residual stress curve is extracted, and the fitted curves for Drs to the cutting rate and the feed rate are respectively shown in FIG. 5 and FIG. 6, and their fitting functions are respectively $Drs(V)=128e^{-0.04012*V}+65.15e^{-0.002407*V}$ and $Drs(tc)=74.3e^{1.945*tc}-50.43e^{-7.369*tc}$.

(c) In an assignment allocation unit, it is mainly dealing with the allocation of the increment of the characteristic index Drs between $\Delta Drs^V$ and $\Delta Drs^{tc}$, and creating an equation set regarding the relations between the increments. The effects of multiple processing parameters on the characteristic index of the residual stress curve are regarded to be linearly superimposed, and by taking the superimposed characteristic indexes of the residual stress curves and their increments as a parameter matrix M, establishing a system of linear equations expressing the relation among the characteristic indexes according to linear inversion equations: G·M=F, where G represents a coefficient matrix, and F represents observation data (i.e., a constant term). Taking the cutting residual stress as an example, increments of Drs resulting from the cutting speed and the feed rate are respectively $\Delta Drs^V=Drs(V)-H(V_0,t_{c0})$ and $\Delta Drs_{tc}=Drs(t_c)-H(V_0,t_{c0})$, and then the total increment (linear superposition) of Drs resulting from the cutting speed and the feed rate is $\Delta Drs=\Delta Drs^V+\Delta Drs^{tc}$, where $\Delta Drs$ can also be expressed as $\Delta Drs=Drs-H(V_0,t_{c0})$. Except the variable $H(V_0,t_{c0})$, other six variables $\Delta Drs^V$, $\Delta Drs^{tc}$, Drs(V), Drs(tc), ΔDrs and Drs in the above four formulas are regarded as parameters, and then the four formulas can be combined into a system of linear equations:

| ΔDrs | $\Delta Drs^{tc}$ | $\Delta Drs^V$ | Drs | $Drs(t_c)$ | Drs(V) | $H(t_{c0}, V_0)$ | Constant term | (1) |
|---|---|---|---|---|---|---|---|---|
| 1 | −1 | −1 | 0 | 0 | 0 | 0 | 0 | |
| 0 | 1 | 0 | 0 | −1 | 0 | 1 | 0 | |
| 0 | 0 | 1 | 0 | 0 | −1 | 1 | 0 | |
| 1 | 0 | 0 | −1 | 0 | 0 | 1 | 0 | |

The above system of linear equations is expressed in a form of a matrix G·M=F as follow:

$$\begin{pmatrix} 1 & -1 & -1 & 0 & 0 & 0 & 0 \\ 0 & 1 & 0 & 0 & -1 & 0 & 1 \\ 0 & 0 & 1 & 0 & 0 & -1 & 1 \\ 1 & 0 & 0 & -1 & 0 & 0 & 1 \end{pmatrix} \begin{pmatrix} \Delta Drs \\ \Delta Drs^{tc} \\ \Delta Drs^V \\ Drs \\ Drs(t_c) \\ Drs(V) \\ H(t_{c0}, V_0) \end{pmatrix} = \begin{pmatrix} 0 \\ 0 \\ 0 \\ 0 \end{pmatrix} \quad (2)$$

(d) The system of linear equations is solved in the microprocessor to obtain the cutting speed V and the feed rate $t_c$ corresponding to the characteristic index Drs. Since the number of equations in the system of linear equations (2) obtained in the previous step is 4 and the number of parameters is 6, the system of linear equations has infinitely many solutions. In order to obtain a unique solution, known conditions need to be added into the system of linear equations so that the number of equations is equal to the number of parameters. The additional known conditions are: (I) a specific value of the characteristic index of the required residual stress distribution curve, and (II) allocation of the specific value to different processing parameters. The additional known conditions must be such that the number of the above equations is equal to the number of parameters. Taking the cutting residual stress as an example, it is required that the maximum residual compressive stress depth in the surface layer after machining is Drs=$C_0$; since Drs can be affected by the cutting speed and the feed rate at the same time, the increment of Drs resulting from the feed rate can be set as $\Delta Drs^{tc}=C_1$ (or the increment of Drs resulting from the cutting speed can be set as $\Delta Drs^V=C_2$). Thus, two known conditions are added into the system of linear equations (1):

$$\begin{pmatrix} \Delta Drs & \Delta Drs^{tc} & \Delta Drs^V & Drs & Drs(t_c) & Drs(V) & H(t_{c0}, V_0) & \text{Constant term} \\ 1 & -1 & -1 & 0 & 0 & 0 & 0 & 0 \\ 0 & 1 & 0 & 0 & -1 & 0 & 1 & 0 \\ 0 & 0 & 1 & 0 & 0 & -1 & 1 & 0 \\ 1 & 0 & 0 & -1 & 0 & 0 & 1 & 0 \\ 0 & 0 & 0 & 1 & 0 & 0 & 0 & C_0 \\ 0 & 1 & 0 & 0 & 0 & 0 & 0 & C_1 \end{pmatrix} \quad (3)$$

The above system of linear equations is expressed in a form of a matrix G·M=F as follow:

$$\begin{pmatrix} 1 & -1 & -1 & 0 & 0 & 0 & 0 \\ 0 & 1 & 0 & 0 & -1 & 0 & 1 \\ 0 & 0 & 1 & 0 & 0 & -1 & 1 \\ 1 & 0 & 0 & -1 & 0 & 0 & 1 \\ 0 & 0 & 0 & 1 & 0 & 0 & 0 \\ 0 & 1 & 0 & 0 & 0 & 0 & 0 \end{pmatrix} \begin{pmatrix} \Delta Drs \\ \Delta Drs^{tc} \\ \Delta Drs^V \\ Drs \\ Drs(t_c) \\ Drs(V) \\ H(t_{c0}, V_0) \end{pmatrix} = \begin{pmatrix} 0 \\ 0 \\ 0 \\ 0 \\ C_0 \\ C_1 \end{pmatrix} \quad (4)$$

The system of linear equations (4) has a unique solution and can be solved as follows:

$$Drs(t_c) = H(t_{c0}, V_0) + C_1$$

$$Drs(V) = C_0 - C_1 \quad (5)$$

Figure 7:
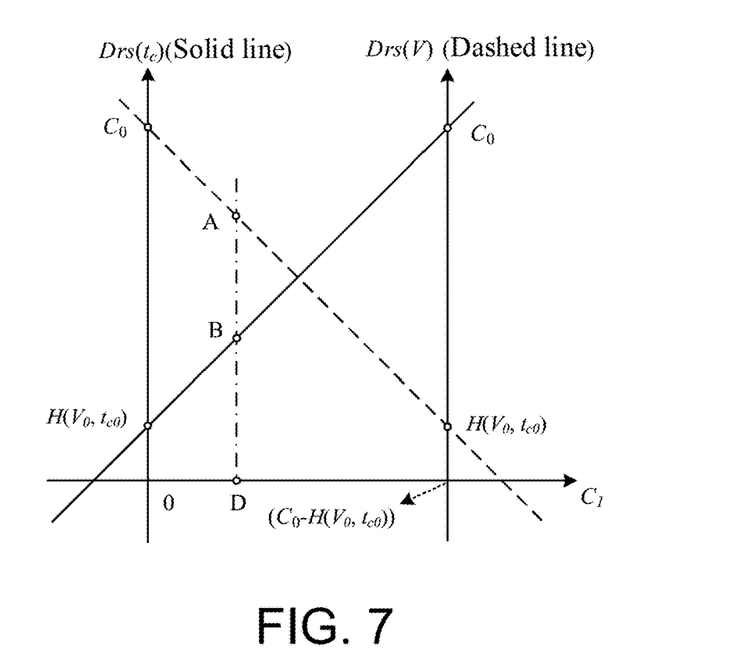
FIG. 7 is a graph of Drs(V) and Drs($t_c$) of the residual stress over $C_1$ according to the preferred embodiments of the present invention.

It can be seen that if $C_1$ is regarded as a variable and Drs (V) and Drs ($t_c$) are regarded as functions, their relationship can be represented by straight lines. FIG. 7 is a graph of Drs(V) and Drs ($t_c$) of the residual stress over $C_1$ according to the preferred embodiments of the present invention. As shown in FIG. 7, the dash and dot line perpendicular to the $C_1$ axis respectively intersects function graph lines of Drs(V) and Drs ($t_c$) at points A and B, indicating that when $C_0$, $C_1$ and H($V_0, t_{c0}$) are determined, values of Drs(V) and Drs($t_c$) can be uniquely determined.

Thus, according to the cutting conditions in step (b), it can be calculated that H($V_0, t_{c0}$)=79 μm, and for the required Drs=$C_0$, it is set that $C_0$=100 μm. There are several situations in determination of $C_1$:

a) if ΔDrs is individually allocated to $\Delta Drs^{tc}$, $\Delta Drs^{tc}=C_1$=21 μm, $\Delta Drs^V$=0 μm;
b) if ΔDrs is individually allocated to $\Delta Drs^V$, $\Delta Drs^{tc}=C_1$=0 μm, $\Delta Drs^V$=21 μm;
c) if ΔDrs is equally allocated to $\Delta Drs^{tc}$ and $\Delta Drs^V$, $\Delta Drs^{tc}=C_1$=10.5 μm, $\Delta Drs^V$=10.5 μm; and
d) if ΔDrs is randomly allocated to $\Delta Drs^{tc}$ and $\Delta Drs^V$, for example, $\Delta Drs^{tc}=C_1$=16 μm, then $\Delta Drs^V$=5 μm.

The assignments of $C_1$ in these four situations will result in the following results of Drs(V) and Drs($t_c$) in four situations:

a) Drs($t_c$)=100 μm, Drs(V)=79 μm;
b) Drs($t_c$)=79 μm, Drs(V)=100 μm;
c) Drs($t_c$)=89.5 μm, Drs(V)=89.5 μm; and
d) Drs($t_c$)=95 μm, Drs(V)=84 μm.

Finally, values of $t_c$ and V in the four situations are calculated by the fitted formulas $Drs(V)=128e^{-0.04012*V}+65.15e^{-0.002407*V}$ and $Drs(t_c)=74.3e^{1.945*t_c}-50.43e^{-7.369*t_c}$ in the step (b):

a) t=0.207 mm, V=60 m/min;
b) $t_c$=0.11 mm, V=29.42 m/min;
c) t=0.172 mm, V=36.3 m/min; and
d) $t_c$=0.19 mm, V=40.7 m/min.

This is the final result obtained by using the set residual stress to calculate the processing parameters. In theory, the use of these calculated processing parameters during processing can achieve required processing residual stress distribution.

(e) Storing the calculated cutting speed V and the feed rate $t_c$ to memory, so cutting speed V and the feed rate $t_c$ can be input to the machine tool when processing.

(f) The cutting speed V and the feed rate $t_c$ are input to the control unit of the machine tool to drive the machine tool to process the cutting process.

Figure 8:
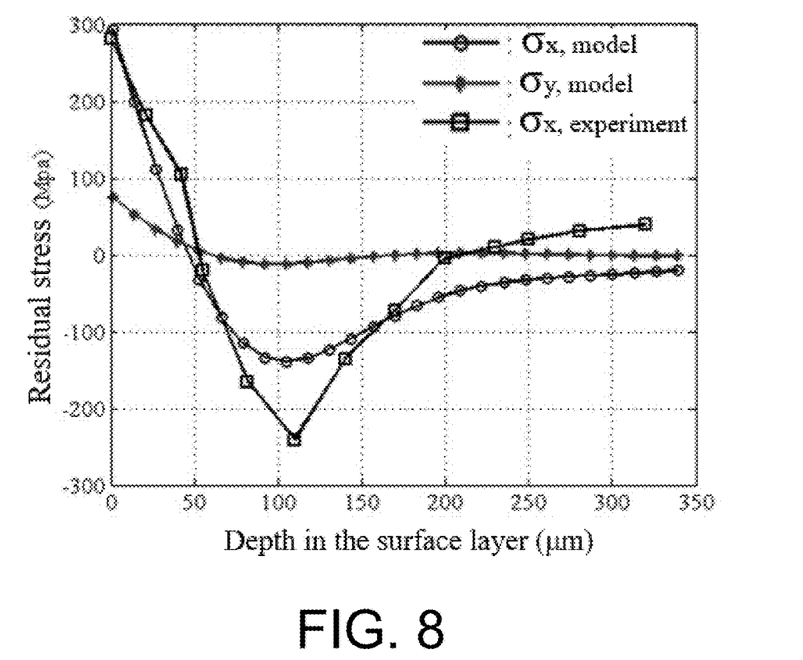
FIG. 8 is a comparison diagram of a residual stress curve calculated at $t_c$=0.207 mm and V=60 m/min according to the preferred embodiments of the present invention and a residual stress curve experimentally measured according to the method provided in the present invention.
Figure 9:
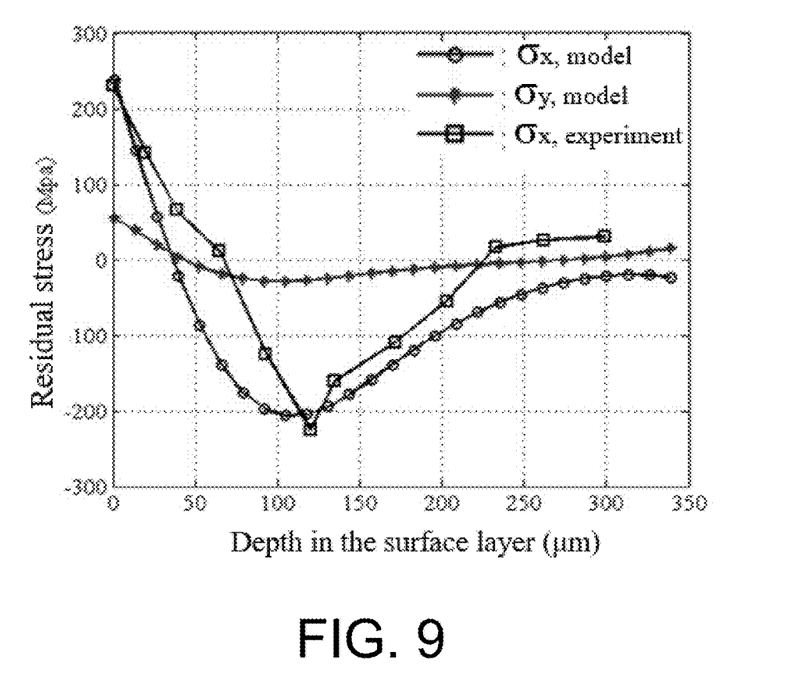
FIG. 9 is a comparison diagram of a residual stress curve calculated at $t_c$=0.11 mm and V=29.42 m/min according to the preferred embodiments of the present invention and a residual stress curve experimentally measured according to the method provided in the present invention.
Figure 10:
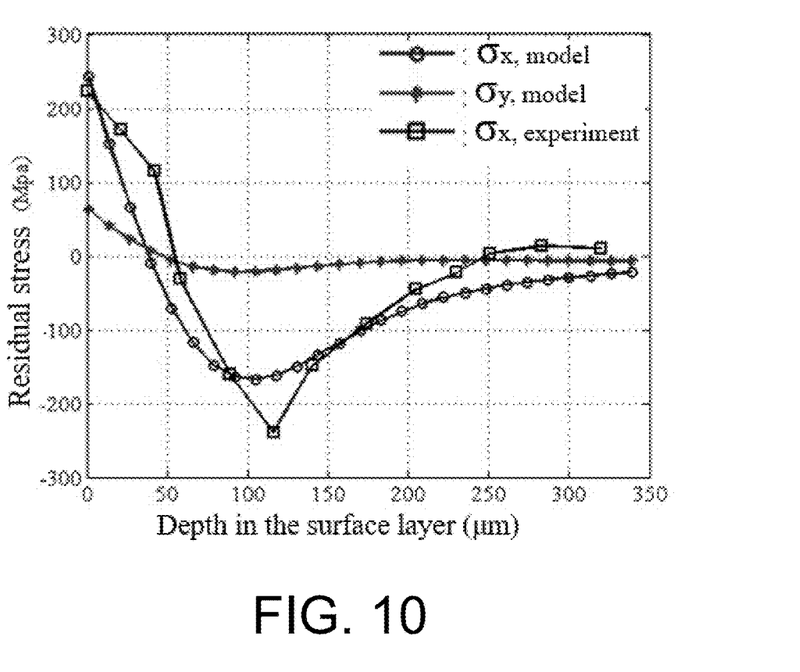
FIG. 10 is a comparison diagram of a residual stress curve calculated at $t_c$=0.172 mm and V=36.3 m/min according to the preferred embodiments of the present invention and a residual stress curve experimentally measured according to the method provided in the present invention.
Figure 11:
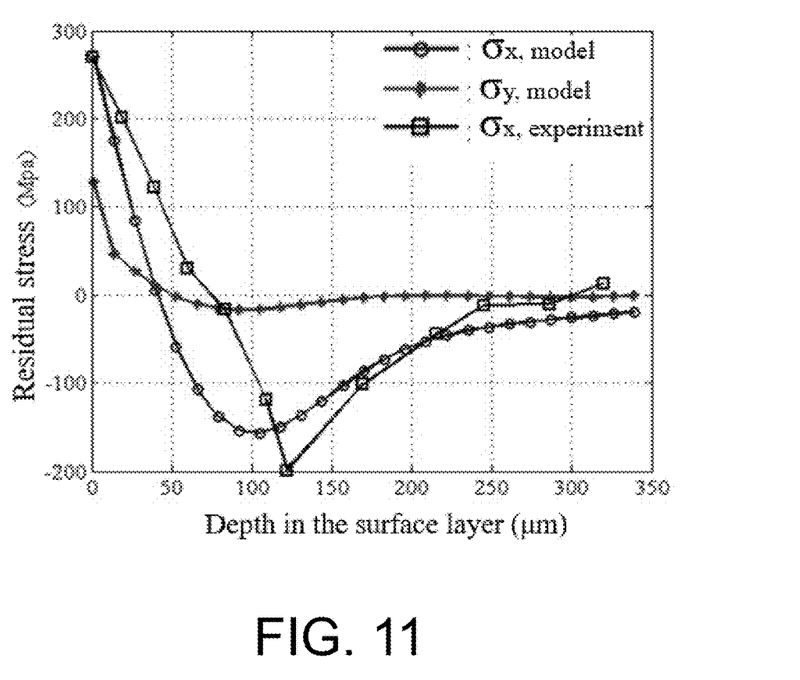
FIG. 11 is a comparison diagram of a residual stress curve calculated at $t_c$=0.19 mm and V=40.7 m/min according to the preferred embodiments of the present invention and a residual stress curve experimentally measured according to the method provided in the present invention.

FIG. 8 is a comparison diagram of a residual stress curve calculated at $t_c$=0.207 mm and V=60 m/min according to the preferred embodiments of the present invention and a residual stress curve experimentally measured according to the method provided in the present invention; FIG. 9 is a comparison diagram of a residual stress curve calculated at $t_c=0.11$ mm and V=29.42 m/min according to the preferred embodiments of the present invention and a residual stress curve experimentally measured according to the method provided in the present invention; FIG. 10 is a comparison diagram of a residual stress curve calculated at $t_c=0.172$ mm and V=36.3 m/min according to the preferred embodiments of the present invention and a residual stress curve experimentally measured according to the method provided in the present invention; and FIG. 11 is a comparison diagram of a residual stress curve calculated at $t_c=0.19$ mm and V=40.7 m/min according to the preferred embodiments of the present invention and a residual stress curve experimentally measured according to the method provided in the present invention. The comparison of the residual stress curve calculated by plugging processing parameters into the residual stress analytical model and the residual stress curve experimentally measured according to the method provided in the present invention is shown in FIGS. 9, 10 and 11. It can be seen that the characteristic indexes Drs of the calculated and experimentally measured residual stress curves are substantially in the vicinity of the desired value of 100 μm, indicating that the proposed residual stress control method has a certain effect.

The above is just described by taking the orthogonal cutting processing as an example, and the method of the present invention can be applicable to residual stress control of other processing methods such as forging, welding, laser processing, wire cutting, grinding, drilling, turning, milling, boring, shot peening and heat treatment.

While particular embodiments of the present invention have been shown and described, it will be obvious to those skilled in the art that changes and modifications may be made without departing from the spirit and scope of the present invention.

What is claimed is:

1. A method for calculating processing parameters for residual stress control by parameter inversion, comprising:
    (a) acquiring a residual stress distribution curve of a processed surface layer of a workpiece by a sensor, extracting a characteristic index Drs reflecting a residual stress distribution characteristic from the residual stress distribution curve and simultaneously acquiring a plurality of processing parameters $A_i$ (i=1, 2,3 ... n) correlated to the characteristic index, where i is a serial number of the processing parameter and n is the total number of the processing parameters;
    (b) presetting initial values $a_{10}, a_{20}, \ldots, a_{i0}, \ldots, a_{n0}$ of the plurality of the processing parameters by a preprocessor, obtaining an initial value H $(a_{10}, a_{20}, \ldots, a_{i0}, \ldots, a_{n0})$ of the characteristic index Drs according to the initial values of the plurality of the processing parameters, and respectively fitting single-variable curves of each of the characteristic index over the respective processing parameters by the preprocessor to obtain respective fitted functions $Drs(A_i)$;
    (c) setting expected values of the characteristic index Drs according to actual needs and assigning characteristic index increments $\Delta Drs^{A_i}$ corresponds to each of the processing parameters $A_i$ by an assignment allocation unit;
    (d) transmitting the initial value H $(H(a_{10}, a_{20}, \ldots, a_{i0}, \ldots, a_{n0})$ of the characteristic index, the fitted function $Drs(A_i)$ of the characteristic index, the characteristic index Drs, and each of the characteristic index increments $\Delta Drs^{A_i}$ to a microprocessor through a input interface, the microprocessor obtaining respective characteristic index Drs corresponding to each of the processing parameters $A_i$ according to relation formulas (i), (ii) and (iii), combining the characteristic index Drs with the fitted function $Drs(A_i)$ to obtain the plurality of the processing parameters $A_i$, and outputting the plurality of the processing parameters $A_i$, wherein the relation formulas (i), (ii) and (iii) are $$\Delta Drs^{A_i} = Drs(A_i) - H(a_{10}, a_{20}, \ldots, a_{i0}, \ldots, a_{n0}) \tag{i}$$

$$\Delta Drs = \sum_{i=1}^{n} \Delta Drs^{A_i} \tag{ii}$$

$$\Delta Drs = Drs - H(a_{10}, a_{20}, \ldots, a_{i0}, \ldots, a_{n0}); \tag{iii}$$

(e) storing the plurality of the processing parameters $A_i$ output from the microprocessor to memory;
    (f) outputting the plurality of the processing parameters $A_i$, in the memory to a control unit of a machine tool to control the machine tool to process the surface layer of the workpiece based on the processing parameters $A_i$, so the processed surface layer of the workpiece has a needed residual stress.

2. The method of claim 1, wherein the characteristic index includes the maximum surface residual stress, the maximum residual compressive stress depth in the surface layer or the depth of the surface tensile stress layer.

3. The method of claim 1, wherein in the step (b), the processing parameters include cutting speed, feed rate, cutting depth, tool edge radius or tool rake angle.

4. The method of claim 1, wherein the initial value $H(a_{10}, a_{20}, \ldots, a_{i0}, \ldots, a_{n0})$ of the characteristic index is calculated by a residual stress analytical model or experimentally measured.

5. The method of claim 1, wherein in the step (b), the drawn curves of the characteristic index over the respective processing parameters $A_i$ are obtained by a processing residual stress theoretical model or experimental measurements.

6. The method of claim 2, wherein in the step (b), the processing parameters include cutting speed, feed rate, cutting depth, tool edge radius or tool rake angle.

7. The method of claim 2, wherein the initial value $H(a_{10}, a_{20}, \ldots, a_{i0}, \ldots, a_{n0})$ of the characteristic index is calculated by a residual stress analytical model or experimentally measured.

8. The method of claim 3, wherein the initial value $H(a_{10}, a_{20}, \ldots, a_{i0}, \ldots, a_{n0})$ of the characteristic index is calculated by a residual stress analytical model or experimentally measured.

9. The method of claim 2, wherein in the step (b), the drawn curves of the characteristic index over the respective processing parameters $A_i$ are obtained by a processing residual stress theoretical model or experimental measurements.

10. The method of claim 3, wherein in the step (b), the drawn curves of the characteristic index over the respective processing parameters $A_i$ are obtained by a processing residual stress theoretical model or experimental measurements.

11. The method of claim 4, wherein in the step (b), the drawn curves of the characteristic index over the respective processing parameters $A_i$, are obtained by a processing residual stress theoretical model or experimental measurements.

* * * * *